(12) United States Patent
Kayser et al.

(10) Patent No.: US 8,225,481 B2
(45) Date of Patent: Jul. 24, 2012

(54) DIFFUSION BONDED COMPOSITE MATERIAL AND METHOD THEREFOR

(75) Inventors: Gregory F. Kayser, Woodland Hills, CA (US); Daniel L. Wisner, Valencia, CA (US); John G. Somerville, Simi Valley, CA (US)

(73) Assignee: Pratt & Whitney Rocketdyne, Inc., Canoga Park, CA (US)

( * ) Notice: Subject to any disclaimer, the term of this patent is extended or adjusted under 35 U.S.C. 154(b) by 645 days.

(21) Appl. No.: 10/441,459

(22) Filed: May 19, 2003

(65) Prior Publication Data

US 2004/0232211 A1 Nov. 25, 2004

(51) Int. Cl.
*B23P 15/00* (2006.01)
*B23K 20/00* (2006.01)

(52) U.S. Cl. ............ 29/557; 29/890.039; 228/193; 228/194; 228/195

(58) Field of Classification Search ............ 29/890.01, 29/557, 890.039, 428, 809.01; 228/193, 228/194, 195; 219/121.14
See application file for complete search history.

(56) References Cited

U.S. PATENT DOCUMENTS

| | | | | |
|---|---|---|---|---|
| 2,457,059 A * | 12/1948 | McQuire | | 205/216 |
| 2,457,060 A * | 12/1948 | McQuire | | 205/216 |
| 2,457,061 A * | 12/1948 | McQuire | | 205/216 |
| 2,970,090 A * | 1/1961 | Withers et al. | | 205/181 |
| 3,090,733 A * | 5/1963 | Brown | | 428/639 |
| 3,314,867 A * | 4/1967 | Gore et al. | | 205/206 |
| 3,530,568 A * | 9/1970 | Owczarski et al. | | 228/194 |
| 3,538,593 A * | 11/1970 | Klimmek et al. | | 228/173.2 |
| 3,552,898 A * | 1/1971 | Bird et al. | | 228/193 |
| 3,555,666 A * | 1/1971 | Rhee | | 228/195 |
| 3,633,267 A * | 1/1972 | Deminet et al. | | 228/181 |
| 3,667,110 A * | 6/1972 | Gwyn, Jr. | | 228/193 |
| 3,678,570 A * | 7/1972 | Paulonis et al. | | 228/194 |
| 3,680,197 A * | 8/1972 | Blum et al. | | 228/193 |
| 3,713,207 A * | 1/1973 | Ruckle et al. | | 228/235.1 |
| 3,762,032 A * | 10/1973 | Bowling et al. | | 228/127 |
| 3,895,923 A * | 7/1975 | Wakefield | | 428/413 |
| 3,964,667 A * | 6/1976 | Anderson | | 228/194 |
| 3,993,238 A * | 11/1976 | Brook et al. | | 228/198 |
| 4,013,210 A * | 3/1977 | Deminet | | 228/106 |
| 4,046,305 A * | 9/1977 | Brown et al. | | 228/194 |
| 4,055,472 A * | 10/1977 | Freshcorn | | 205/216 |
| 4,126,523 A * | 11/1978 | Wong | | 205/212 |
| 4,153,195 A * | 5/1979 | Barozzi et al. | | 228/183 |
| 4,197,977 A * | 4/1980 | Deminet | | 228/106 |
| 4,208,222 A * | 6/1980 | Barlow et al. | | 148/279 |

(Continued)

FOREIGN PATENT DOCUMENTS

EP 117671 A1 * 9/1984

(Continued)

*Primary Examiner* — Essama Omgba
(74) *Attorney, Agent, or Firm* — Carlson, Gaskey & Olds, P.C.

(57) ABSTRACT

Methods and apparatus are provided for forming a diffusion bonded composite structure. The composite structure includes at least one internal void or feature. Surfaces to be bonded are cleaned and prepared for bonding. The exposed joints of the composite structure where the surfaces interface are sealed. The composite structure is placed in hot isostatic process furnace. The furnace is pressurized to a low pressure below 1500 pounds per square inch that forces the surfaces to be bonded in intimate contact with one another. The composite structure is heated to promote diffusion bonding at the interface of surfaces in contact with one another.

11 Claims, 3 Drawing Sheets

U.S. PATENT DOCUMENTS

| | | | | |
|---|---|---|---|---|
| 4,485,961 A * | 12/1984 | Ekbom et al. | | 228/193 |
| 4,567,066 A * | 1/1986 | Schultz et al. | | 427/305 |
| 4,606,778 A * | 8/1986 | Jahnke | | 148/527 |
| 4,676,843 A * | 6/1987 | Nazmy | | 419/8 |
| 4,732,312 A * | 3/1988 | Kennedy et al. | | 148/535 |
| 4,840,820 A * | 6/1989 | Schultz et al. | | 427/305 |
| 4,890,784 A * | 1/1990 | Bampton | | 228/194 |
| 4,900,638 A * | 2/1990 | Emmerich | | 428/606 |
| 4,919,323 A * | 4/1990 | Mahoney et al. | | 228/157 |
| 4,925,536 A * | 5/1990 | Lehmkuhl et al. | | 205/170 |
| 4,948,031 A * | 8/1990 | De Clerck | | 228/194 |
| 4,948,457 A * | 8/1990 | Cooper et al. | | 216/34 |
| 5,025,974 A * | 6/1991 | Strickland | | 228/107 |
| 5,151,332 A * | 9/1992 | De Clerck | | 428/650 |
| 5,165,591 A * | 11/1992 | Pratt | | 228/193 |
| 5,193,737 A * | 3/1993 | Carraher | | 228/157 |
| 5,224,645 A * | 7/1993 | Cooper et al. | | 228/157 |
| 5,226,578 A * | 7/1993 | Douglas | | 228/157 |
| 5,242,102 A * | 9/1993 | Nicolas | | 228/193 |
| 5,253,796 A * | 10/1993 | Stacher et al. | | 228/193 |
| 5,284,288 A * | 2/1994 | Woodward | | 228/157 |
| 5,323,536 A * | 6/1994 | Fowler et al. | | 29/889.72 |
| 5,361,971 A * | 11/1994 | Williams et al. | | 228/193 |
| 5,368,719 A * | 11/1994 | Troup-Packman | | 205/213 |
| 5,373,983 A * | 12/1994 | Stenard et al. | | 228/57 |
| 5,415,336 A * | 5/1995 | Stenard et al. | | 228/193 |
| 5,503,532 A * | 4/1996 | Schilling | | 416/233 |
| 5,534,358 A * | 7/1996 | Troup-Packman | | 428/648 |
| 5,613,299 A * | 3/1997 | Ring et al. | | 29/890.01 |
| 5,701,670 A | 12/1997 | Fisher et al. | | |
| 5,799,860 A * | 9/1998 | Demaray et al. | | 228/194 |
| 5,858,556 A * | 1/1999 | Eckert et al. | | 428/586 |
| 6,205,661 B1 * | 3/2001 | Ring | | 29/890.01 |
| 6,257,481 B1 * | 7/2001 | Shirzadi-Ghoshouni et al. | | 228/195 |
| 6,258,415 B1 * | 7/2001 | Troup-Packman | | 427/437 |
| 6,264,091 B1 * | 7/2001 | Milburn | | 228/157 |
| 6,464,129 B2 * | 10/2002 | Stueber et al. | | 228/194 |
| 6,478,214 B1 * | 11/2002 | Rigal et al. | | 228/193 |
| 6,555,250 B2 * | 4/2003 | Shah et al. | | 428/652 |
| 6,579,431 B1 * | 6/2003 | Bolcavage et al. | | 204/298.13 |
| 6,790,293 B2 * | 9/2004 | Nomura et al. | | 148/24 |
| 6,793,124 B1 * | 9/2004 | Takahashi et al. | | 228/194 |
| 6,812,723 B2 * | 11/2004 | Mikami | | 324/761 |
| 6,849,138 B1 * | 2/2005 | Kamiyama et al. | | 148/275 |
| 6,871,398 B2 * | 3/2005 | Richardson et al. | | 29/889.72 |
| 6,880,745 B2 * | 4/2005 | Stueber et al. | | 228/194 |
| 6,938,816 B2 * | 9/2005 | Tominaga et al. | | 228/193 |
| 6,938,817 B2 * | 9/2005 | Saldana et al. | | 228/194 |
| 2005/0109821 A1 * | 5/2005 | Li | | 228/219 |

FOREIGN PATENT DOCUMENTS

| | | | |
|---|---|---|---|
| EP | 494579 A1 * | 7/1992 | |
| EP | 626469 A1 * | 11/1994 | |
| GB | 2078338 A * | 1/1982 | |
| GB | 2167329 A * | 5/1986 | |
| GB | 2194552 A * | 3/1988 | |
| JP | 55114482 A * | 9/1980 | |
| JP | 63051642 A * | 3/1988 | |
| JP | 63063583 A * | 3/1988 | |
| JP | 02073991 A * | 3/1990 | |
| JP | 05171488 A * | 7/1993 | |

* cited by examiner

DIFFUSION BONDED COMPOSITE MATERIAL AND METHOD THEREFOR

FIELD OF THE INVENTION

The present invention generally relates to material bonding, and more particularly relates to a diffusion bonded composite structure.

BACKGROUND OF THE INVENTION

A power plant typically converts an energy source such as moving water (dam), nuclear, natural gas, or coal to electricity. One type of energy conversion process uses heat to generate electricity. For example, natural gas is ignited with air to create a hot gas. The hot gas is directed through a compressor to a power turbine. The power turbine has blades that are induced to spin by the hot gas. The rotational motion of the power turbine is coupled to an electrical generator. The system is made more efficient by recovering the hot gas that has passed through power turbine in a heat recovery steam generator that is then coupled to a steam turbine that further drives the electrical generator.

Many components of a natural gas power plant such as a transition duct and heat exchangers are exposed to extremely hot gases at temperatures approaching 3000 degrees Fahrenheit. The composite materials used to make these components are specifically designed to handle the adverse conditions in which they operate. Furthermore, the composite materials are formed into complex shapes. The high heat and oxidizing environment that these components are subject to introduce long term reliability problems that increase the cost and maintenance of a system. In general, the components cannot be cast, forged, or formed from a single sheet of material because of structures that are formed within the component. For example, cooling channels within the walls of material are often necessary to reduce the heat on the component. This problem is not isolated to the energy industry, for example, the air craft and rocket industries have almost identical problems.

One method of fabrication to produce a composite material is to form it from more than one sheet of material. The components which make up the composite material are bonded together. Typically, the composite material will have at least one feature or void internal to the structure. As mentioned above, cooling channels or passages are often desirable in a component having a surface exposed to high temperatures. A manufacturable method to construct a formable composite material having an internal feature such as a cooling channel is created using three sheets of material. A center sheet is machined or stamped having grooves or cut outs corresponding to the internal channels. A sheet of material is placed on either side of the center sheet. The three sheets are then bonded together. The composite material can then be cut and formed into the appropriate shape. Typically a brazing process is used in conjunction with extensive tooling to maintain interfacial pressure to bond the materials together to form a composite sheet. Residual braze alloys can introduce foreign elements that interfere with subsequent forming and or welding processes. Moreover, the quality of the bond of each sheet to the other may not be uniform and results in long term reliability issues requiring scheduled replacement. The cost to manufacture can skyrocket because the tooling can be unique to make each component.

Accordingly, it is desirable to produce a composite material that is stronger and more reliable. In addition, it is desirable to reduce the need for unique tooling and lower the cost of manufacture. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A method is provided to diffusion bond a composite structure. The composite structure includes at least one internal void or feature. The method includes surface preparation of the components of the composite structure in preparation for bonding. The composite structure is placed in a sealable container. The container is sealed and pressurized less than 1500 pounds per square inch. The low pressure forces the surfaces to be bonded in intimate contact with one another. The composite structure is heated to form diffusion bonds at the bond interface.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
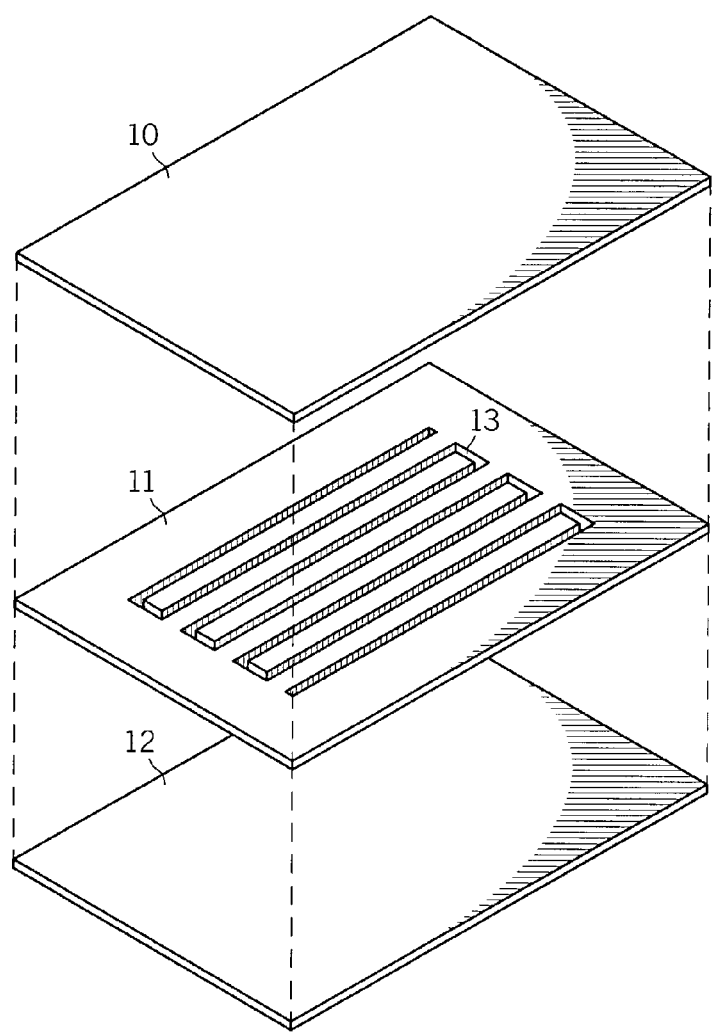
FIG. 1 is an illustration of a first piece of material, a second piece of material, and a third piece of material that combine to form a composite material.

FIG. 1 is an illustration of a first sheet of material 10, a second sheet of material 11, and a third sheet of material 12. First sheet of material 10, second sheet of material 11, and third sheet of material 12 are bonded together to form a composite material. The composite material includes at least one internal void or feature. The composite material can formed into a complex shape. Although the material is shown in sheets it does not necessarily have to be planar in form. Also, the use of three sheets of material is for illustration purposes only, the composite structure can be made of two or more components as required by the complexity of the structure. Similarly, the features, voids, or channels can be made in any component of the composite structure.

In general, the purpose of forming the composite material is to provide a cost effective solution to building a functional part that is not easily manufactured using other standard techniques such as machining or casting. For example, second sheet of material 11 is machined having channels 13. The process of cutting channels 13 in second sheet of material 11 is simple and relatively cost effective. As shown, first sheet of material 10 and third sheet of material 12 are solid sheets. In many of the applications that require a channeled composite material it is desirable for the material to be as light weight as possible. Often, first sheet of material 10 and third sheet of material 12 are made very thin. The manufacturing process should not deform or alter first sheet of material 10, second sheet of material 11, and third sheet of material 12.

The composite material is formed by placing first sheet of material 10 on a first major surface of second sheet of material 11 and third sheet of material 12 on a second major surface of second sheet of material 11. Typically, there is a large interface area where bonding occurs. First sheet of material 10, second sheet of material 11, and third sheet of material 12 are bonded together to form the composite material. Channels 13 in second sheet of material and 11 are enclosed above and below by first sheet of material 10 and third sheet of material 13 forming features or voids in the composite material. Ideally, the bonding of major surfaces between first sheet of material 10 and second sheet of material 11, and similarly, second sheet of material 11 and third sheet of material 12 are extremely strong that allows the composite material to be shaped into a functional component and allows it to withstand the environment in which the component is placed.

Figure 2:
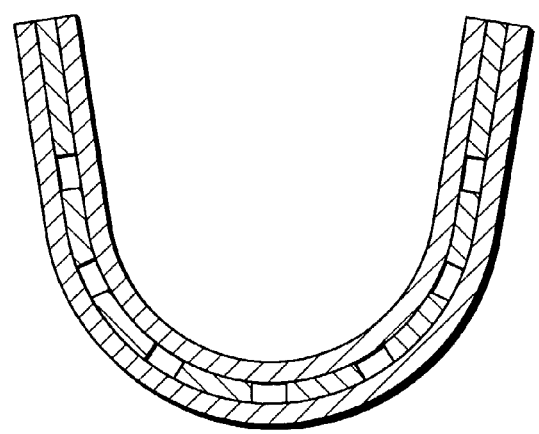
FIG. 2 is an illustration of a composite material.

FIG. 2 is a cross-section of a composite material 20. Referring to FIG. 1, composite material 20 is formed by bonding first sheet of material 10, second sheet of material 11, and third sheet of material 12 together. The cross-section shows how the composite material 20 includes channels 13 that were cut into second sheet of material 11. Referring back to FIG. 2, composite material 20 is bent in a U-shape to show that it may be formed into complex shapes. Composite material 20 provides a formable material that includes features such as the passageways shown that would be difficult or cost prohibitive to be formed by other methods.

In general, composite material 20 has been formed using a brazing process. Brazing is a well known process for joining similar or dissimilar metals. The brazing material is designed to have a lower melting temperature than the base materials being joined together. Brazing differs from welding in that the base materials and brazing material are heated to temperature that melts and liquefies the brazing material but not the base material.

A process for forming composite material 20 is achieved by placing a sheet of brazing material between each of the major surfaces to be fastened together. Referring to FIG. 1, a first sheet of brazing material (not shown) is placed between first sheet of material 10 and second sheet of material 11. Similarly, a second sheet of brazing material (not shown) is placed between second sheet of material 11 and third sheet of material 12. In one embodiment, heavy weights are placed on the materials to press them together so the major surfaces have good contact with one another. First sheet of material 10, second sheet of material 11, and third sheet of material 12 are then heated until the brazing sheets melt to form a bond between major surfaces. In another embodiment, a mechanical press is used to hold the major surfaces to be bonded in contact with one another. It should be noted that this process would not perform well for anything but planar materials. There would be a significant problem in creating a situation of applying uniform pressure equally across the major surfaces to be bonded on objects having irregular shapes.

Figure 3:
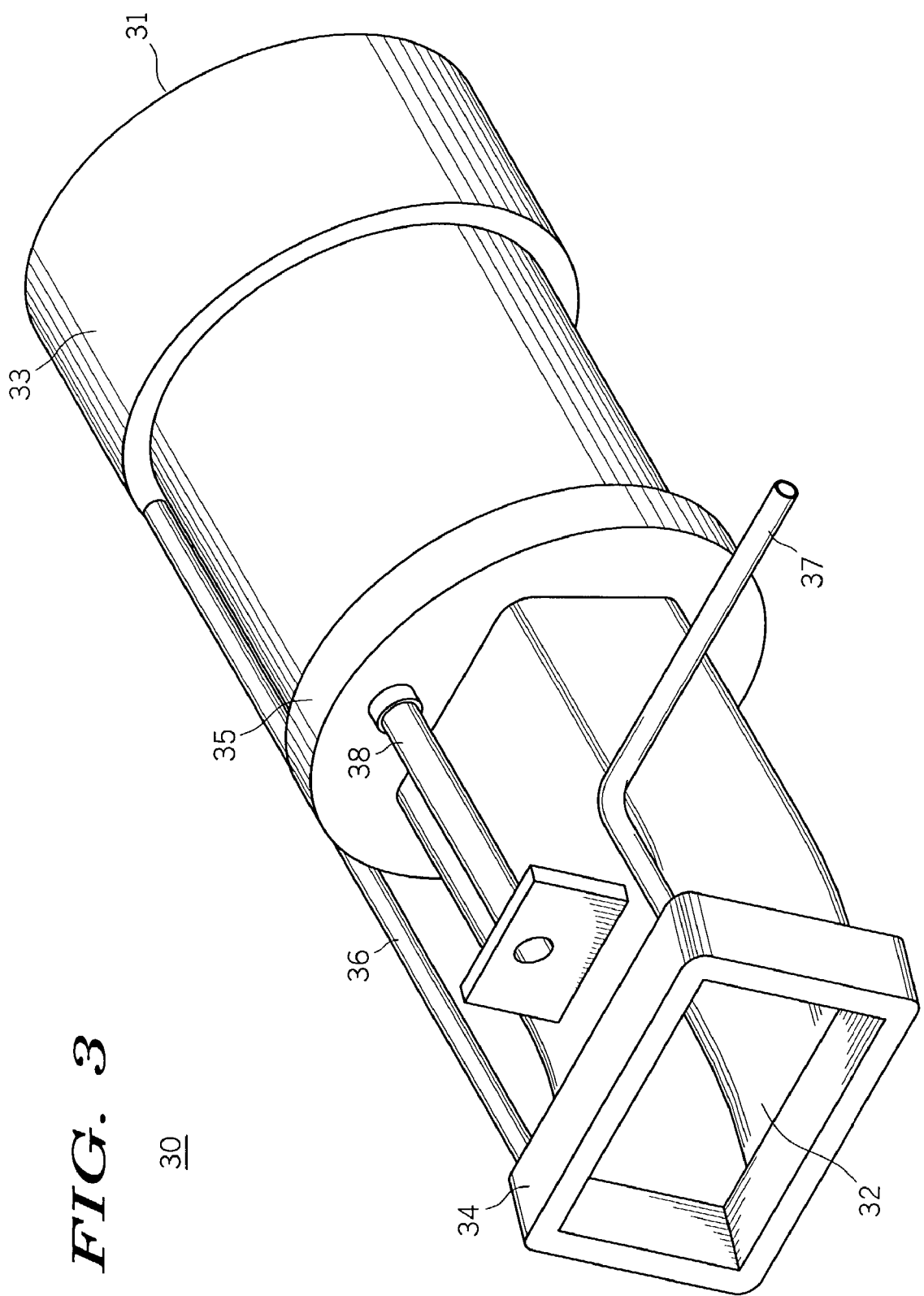
FIG. 3 is an illustration of a transition duct used to direct hot gases in a turbine.

FIG. 3 is an illustration of a transition duct 30 used to direct hot gases in a turbine. This illustration is an example to show the complex shapes and the severe environment that composite sheet of material 20 of FIG. 2 is used. Transition duct 30 includes a major opening 31 and a major opening 32 through which hot gases travel. The majority of transition duct 30 is formed from a channeled composite material similar to that shown in FIG. 2. The channels (not shown) in the wall of transition duct 30 run longitudinally and are used to flow a gas or liquid to dissipate heat.

A manifold 33 forms a collar around opening 31. Manifold 33 couples to the channels in the wall around the entire circumference of transition duct 30 near major opening 31. A pipe 36 has a first end that couples to manifold 33 for bringing the gas or liquid to the wall of transition duct 30 near major opening 31. Similarly, a manifold 34 forms a collar around major opening 32. Manifold 34 couples to the channels in the wall of transition duct 30 near major opening 32. A second end of pipe 36 couples to manifold 34. A pipe 37 couples to manifold 34 and is an inlet or outlet (depending on the configuration). Note that manifolds 33 and 34 are coupled together through pipe 36.

A manifold 35 is centrally located in transition duct 30. Manifold 35 couples to the channels around the entire circumference of transition duct 30 in its central location. A pipe 38 couples to manifold 35. One example of how transition duct 30 is cooled begins with providing cool gas or liquid via pipe 38 to manifold 35. The gas or liquid is coupled to the channels in the wall of transition duct 30 and flows in two directions. Some of the gas or liquid travels from the central location of manifold 35 through the channels in the wall of transition duct 30 to manifold 33 where it is exhausted through pipe 36 to manifold 34. The remaining portion of gas or liquid travels from manifold 35 through the channels in the wall of transition duct 30 to manifold 34. The gases or liquid remove heat from the walls of transition duct 30 and are exhausted through pipe 37.

In an embodiment of transition duct 30, hot gases passing through transition duct 30 are at a temperature of 2800 degrees Fahrenheit. Running gas or liquid through the walls of transition duct 30 lowers the temperature of the channeled composite material in a range of 800 to 1200 degrees Fahrenheit. The inner wall of transition duct 30 sees extremely high temperatures even with active gas or liquid cooling. Typically the hot gases are not provided continuously to transition duct 30 which means the channeled composite material that comprises transition duct 30 goes through cycles of both heating and cooling. This introduces low cycle fatigue and plastic deformation as a factor impacting long term reliability. Turbines have many moving components that cause the entire assembly to vibrate. Vibration is another factor that is a detrimental to the life of transition duct 30.

Failures often occur to the composite materials used to make components that operate in these extreme environments. Ideally, the entire area of the interface is joined with brazing material. In practice this is difficult to achieve. The pressure at the interface can be non-uniform when held together with weights or a press. Thus, the strength of the bond may be weak in areas of the composite material. Several different failures have been identified. One type of failure is a hot wall burst. This failure is due to delamination of the composite material due to weak bonding. Separation of the composite materials affects the cooling passageways thereby changing the heat dissipated local to the delamination area. The wall can burst in a region that becomes over heated because the active cooling was diverted from that area. A second failure is individual hot wall cracking. The predominant factor in this type of failure is heating and cooling that creates plastic cycling (low cycle fatigue (LCF)). A third failure mechanism is local blistering and cracking. Localized overheating occurs followed by peak strain damage. Although it is not a failure related to the component in use, the brazing process itself introduces contaminants to the composite material. Subsequent welding to the component using the composite material is often performed during its construction. The integrity of the welds can be suspect when contaminants or the brazing material itself are local to the weld area.

In general, the cost to manufacture, the long term reliability, and long term cost of operation are limitations of the brazing bonding process used to form composite materials as described hereinabove.

Figure 4:
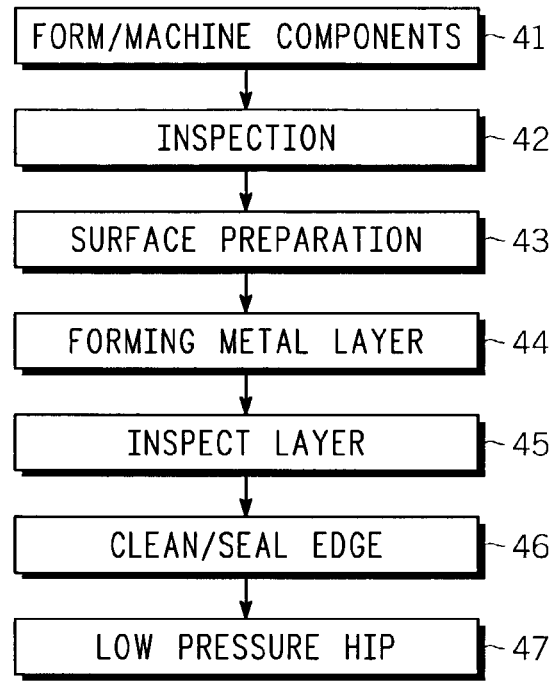
FIG. 4 is a flow diagram of a bonding process in accordance with the present invention.

FIG. 4 is a flow diagram of a bonding process 40 in accordance with the present invention. In general, there is a need to provide a low cost methodology for forming a composite material comprising more than one component bonded together. The composite material includes at least one internal void or feature, such as a channel. The bond needs to be formed evenly over the entire interface area especially when the area to be bonded is substantial. The bonds holding the composite material together must hold under adverse conditions. In particular, the composite material would be useful in the energy, rocket, and aircraft fields although not necessarily limited to just these applications.

Bonding process 40 is useful for nickel based materials, super alloys, stainless steel, iron base materials, titanium based materials, aluminum based materials, and copper based materials. A step 41 includes forming or machining the components of the composite structure to be bonded together. In particular, each component will be formed having at least one surface that is mated to a surface of another component (or itself). The components when bonded together form a composite structure that includes at least one internal void or feature.

A step 42 is an inspection process of the material and the (bond) surfaces prior to the bonding process. The step 42 may include a visual inspection of the surfaces to be bonded and measurement of the surface finish to ensure bonding surfaces will adequately mate together.

A step 43 is a surface preparation step. What is required for surface preparation is dependent on the materials being bonded together. In some cases, only minimal cleaning may be required to prepare the surface for the next step of bonding process 40. An example of a more complicated surface preparation step is etching the surfaces to be bonded. Etching cleans and prepares a surface for other subsequent steps. In particular, some metals readily oxidize. A layer of oxidation may inhibit a good bond from forming. In an embodiment of step 43, the major surfaces of the component are etched to remove any oxidation and expose a surface of bare metal or metal alloy. The surfaces to be bonded when viewed under a microscope would have a texture or high and low points. In other words, placing the surfaces to be bonded together under ambient conditions does not produce perfect surface to surface contact.

A step 44 is a step of forming a layer of metal or metal alloy on the major surfaces of the components. In general, there are many processes such as plating, spraying, and material deposition that can be used to form a uniform layer of predetermined thickness on a component surface. In an embodiment of step 44, a metallic layer is formed on the surfaces to be bonded using a plating process. The metallic layer is formed on the surfaces before any significant oxidation or contamination occurs after the etching of step 43 is completed. Typically, the metal or metal alloy used to form the metallic layer on the surfaces to be bonded have similar material characteristics as the component material. The function of the plated metallic layer differs significantly from a brazing sheet used in prior art bonding processes. The metallic layer is not used to adhere the surfaces to be bonded together (as in brazing) but is useful for other reasons. For example, the metallic layer on the surfaces to be bonded is placed on the component to prevent an oxide layer from forming thereby creating a better bond to be formed in bonding process 40. The metallic layer will not exist after bonding process 40 is completed. It should be noted that step 44 is dependent on the materials being bonded together. Some materials, for example titanium do not require an intermediate layer formed on the surfaces to be bonded (step 44 is not needed). Also, the layer formed on the surface to be bonded can be materials other than metals or metal alloys which will similarly diffuse into the surrounding bulk material near the bonding interface and not significantly change the bulk material composition.

A step 45 is an inspection step for measuring the thickness of the metallic layer on the surfaces of the components to be bonded. Ideally, the layer of metal is uniform across the major surface and has the predetermined thickness desired. In an embodiment of step 45, measurements of the thickness of the layer of metal can be taken at a number of spots on a surface to determine whether the thickness and uniformity is within specification. In general, this is an important parameter because forming the metallic layer to thin or too thick will result in a poor bond being formed in bonding process 40.

A step 46 is a clean and seal step. The components are cleaned to remove contaminants after the metallic layer is formed on the surfaces to be bonded. The sealing step eliminates any route for contaminants to enter the interface region of the surfaces where bonding occurs. In the simple case where the surfaces of two planar sheets are being joined together, the area where contamination can enter is in the exposed joint of the interface where the two planar sheets meet along the edge or periphery. In an embodiment of step 46, the components are held together using a fixture that leaves accessible the exposed joint produced by placing the surfaces to be bonded in contact with one another. Welding is a method that will seal the joint by melting material at the joint interface together. Welding will also hold the components together allowing the materials to be handled as a composite structure until bonding process 40 is complete. In an embodiment of step 46, an electron beam welder in an enclosure is used for welding. The composite structure is placed in the enclosure. The enclosure allows welding to occur in a vacuum or inert gas atmosphere. Implementing a sealing process in a vacuum provides a benefit of removing gases that could be trapped between the surfaces of the components to be bonded and promotes a better weld. Manufacturing is simplified and cost reduced because the components can be made in batch lots up to this point and inventoried with an almost indefinite shelf life.

A step 47 is a low pressure, hot isostatic process (HIP) that bonds the surfaces of the components together. In general, HIP bonding is a process in which the composite structure to be bonded is simultaneously subjected to both heat and pressure, typically in an inert gas medium. The composite structure is placed in a HIP furnace. The HIP furnace is a sealable container that is pressurized and heated during the bonding process. Utilizing a gas to place pressure on the component during bonding process 40 is beneficial. The gas uniformly applies pressure on all exposed surfaces of the composite structure. The shape of the composite structure is no longer an issue as it was when using weights or a press to hold the materials together. The uniform pressure on the exposed surface of the composite structure translates directly to providing an almost equal pressure across the entire area of the surfaces being bonded. In other words, all areas of the composite structure to be bonded can be placed in intimate contact with one another under similar conditions.

The composite structure is heated to a temperature in a range of 600 to 2225 degrees Fahrenheit depending on the type of material being bonded. Similarly, a container in which the composite structure is placed is pressurized to a low pressure in a range of 0.5 to 1500 pounds per square inch (psi)

which is also material dependent. The combination of heat and pressure enables a diffusion bond to be formed at the interface of the surfaces that are in contact with one another. It should be noted that the materials do not melt or liquefy in bonding process 40. In theory, the material on either side of the bonding interface diffuses in all directions and is allowed to diffuse for a time period until the interface no longer exists. Heat increases the speed at which diffusion occurs. The temperature limit of bonding process 40 exists at a point where the properties of the materials being bonded are compromised or changed from their desired characteristics. The interface does not exist after diffusion bonding. The material in the location of the interface appears similar to the material above or below it. The metallic layer (in step 44) formed on the surfaces to be bonded diffuses into the bulk material and is no longer distinguishable in a cross-section of the composite structure.

The container is pressurized to a low pressure that is applied to the composite structure to provide intimate contact between the surfaces to be bonded. As mentioned hereinabove, on a microscopic level the surfaces to be bonded are not perfectly smooth such that the contact area between surfaces to be bonded is less than desirable for diffusion bonding. The pressure is selected to initiate creep at the interface to increase the contact area. The composite structure includes features or voids Increasing the pressure greater than 1500 psi would be detrimental by deforming, coining, or altering the composite structure (due to pressure). For example, a high external pressure on the composite structure will try to close or fill in the void or feature internal to the composite structure. Bonding process 40 results in a low cost manufacturable process that provides a diffusion bonded composite structure that is extremely strong in harsh environments and is not prone to delamination, cracking, or blistering.

The pressure and temperature used for a specific application are a function of the requirements placed on the composite material. In particular, the bond strength is a function of the heat applied, amount of contact at the interface, and the time allowed for diffusion to occur. The magnitude of pressurization in the container is a function of the amount of internal voids or features placed in the composite structure and the strength and thickness of the material used to form the composite structure. Composite structures made of Ni and Fe based materials using bonding process 40 will require pressurization within a range of 25 to 1500 psi and temperatures within a range of 1500 to 2225 degrees Fahrenheit. Composite structures made of Ti and T-Al based materials using bonding process 40 will require pressurization within a range of 0.5 to 1000 psi and temperatures within a range of 1200 to 1800 degrees Fahrenheit. Finally, composite structures made of Al based materials using bonding process 40 will require pressurization within a range of 0.5 to 1000 psi and temperatures within a range of 600 to 1100 degrees Fahrenheit.

Figure 5:
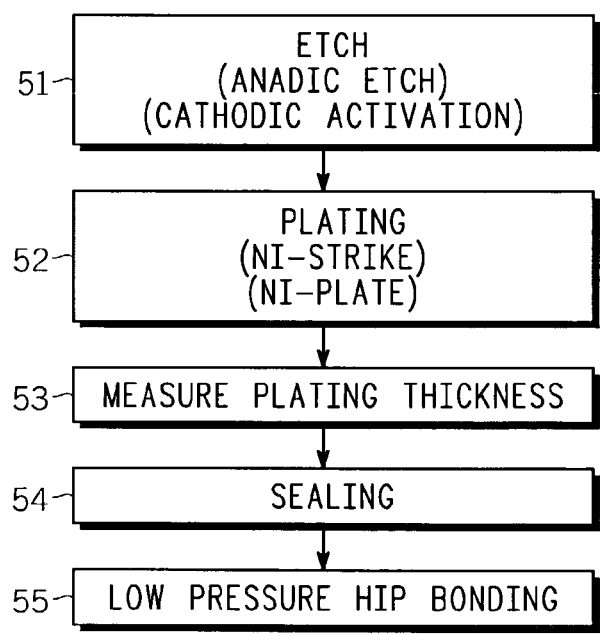
FIG. 5 is a flow diagram of a bonding process for nickel based materials in accordance with the present invention.

FIG. 5 is a flow diagram for a bonding process 50 for nickel based materials in accordance with the present invention. Nickel based materials are often used in applications where the component is subject to high heat. Nickel is the predominant component of the alloy but other materials are often present. For example, a high temperature nickel based alloy might include percentages of Cr, Fe, Co, Mo, Nb/Ta, Mn, Si, Al, Ti, and C. In general, the nickel alloy readily forms an oxide layer on its surface that aids in its ability to resist heat. The oxide layer also makes bonding problematic when forming a composite structure out of a nickel based material.

A step 51 is an etch step that removes an oxide layer on the nickel based material used to form the composite structure. An anodic etch on the components of the composite structure is performed using phosphoric acid to remove the oxide. In an embodiment of step 51, an additional process step is performed. Cathodic activation further prepares the surfaces of the composite structure that are to be bonded. The cathodic activation is performed using sulfuric acid and has been found to enhance surface preparation for diffusion bonding of nickel based materials.

A step 52 is a plating step for putting a layer of nickel on the surfaces to be bonded. The layer of nickel is less prone to forming an oxide layer that would inhibit or degrade diffusion bonding. Moreover, the thickness of the layer of nickel is chosen so that it diffuses into the materials being bonded as diffusion bonds are formed. There is not a significant change in the material composition that would affect material properties at the interface by the diffusion of the nickel comprising the plated nickel layer because the main constituent of the materials being bonded is nickel. In an embodiment of the nickel plating process a minimum thickness for the plated layer of nickel of approximately 0.0002 inches which is sufficient to prevent oxidation of the underlying bulk (nickel alloy) material. A maximum thickness for the plated layer of nickel of approximately 0.0008 inches ensures that all of the nickel diffuses into the materials being bonded within the time period for bonding process 50.

In an embodiment of step 52, a Ni-strike plating process is utilized to form the layer of nickel on the surfaces to be bonded. The solution used for the Ni-strike plating process is a Ni-Chloride solution. The rate at which nickel is being plated on the bonding surfaces is reduced as the nickel layer increases in thickness. In an embodiment of step 52, the components being plated are removed from the Ni-strike plating process when the plating rate slows down. The components receive a Ni-plate process that further builds the thickness of the nickel layer on the surfaces to be bonded. The Ni-plate process uses a Ni-sulfamate solution to plate nickel. Using both a Ni-strike and Ni-sulfamate plating process reduces the time to build up the layer of nickel on the bonding surfaces thereby decreasing production time and cost to manufacture.

A step 53 is a measurement of the thickness of the layer of nickel on the surfaces being bonded. In an embodiment of step 53, measurements are taken at different locations on each surface to be bonded to ensure that the plated nickel layer is within the range of 0.0002-0.0008 inches thick.

A step 54 is a sealing process. The exposed joint of the interface between the materials being bonded are sealed to prevent contaminants from entering the composite material prior to diffusion bonding. In an embodiment of the sealing process, the composite structure is held with a fixture in a final (bonding) position with the surfaces to be bonded in contact with one another. In an embodiment of step 54, the exposed joint of the interface of the surfaces being bonded is electron beam welded in a vacuum or inert gas atmosphere. Vacuum or providing an inert gas atmosphere reduces trapped gas in the composite structure that could react with the materials being bonded and affect the integrity of the diffusion bond. Electron beam welding not only seals the composite structure but physically holds it together as an, integrated structure. Furthermore, the composite structure can be stored indefinitely so that the diffusion bonding is performed at a later date which provides significant flexibility to the production process.

A step 55 is a diffusion bonding process. The diffusion bonding process is a low pressure hot isostatic process (HIP) bonding process. As mentioned previously, HIP bonding can be a batch process where more than one composite structure is placed in a HIP furnace to be bonded under pressure and heat. In an embodiment of step 55, the composite structure is heated within a temperature range of 1500-2225 degrees Fahrenheit within a pressure range of 25-1500 psi for a period typically less than 10 hours. A very strong diffusion bond between the major surfaces of the nickel based materials will form without comprising the material properties nor changing the physical dimensions and features of the composite structure. Forming composite structures using bonding process 50 increases the strength of the bonds in some applications by 40% or more. Furthermore, diffusion bonding eliminates the problem with contamination. For example, further welding on the composite structure dose not pose the risk of contacting brazing material which would degrade the weld. The strength of the low pressure HIP diffusion bonding reduces delamination, cracking, and blistering thereby increasing the life cycle of the components and reducing operating costs. Moreover, the finished product can be manufactured at lower cost with higher quality.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A process for bonding a composite structure for high temperature applications made of Ni based materials comprising the steps of:
    etching surfaces of the composite structure to be bonded together to remove oxide;
    electrodepositing a layer of nickel on said etched surfaces of the composite structure to be bonded together before oxidation of said etched surfaces occurs to prevent an oxide layer from forming on at least one of said etched surfaces;
    sealing exposed joints of the composite structure; and
    applying hot isostatic processing to the composite structure at low pressure wherein a pressure of between 25 and 1500 pounds per square inch is used during a heat cycle.

2. The process for bonding a composite structure for high temperature applications made of Ni based materials of claim 1 wherein the step of etching surfaces of the composite structure to be bonded together to remove oxide further includes a step of performing an anodic phosphoric acid etch on said surfaces of the composite structure to be bonded together.

3. The process for bonding a composite structure for high temperature applications made of Ni based materials of claim 2 wherein the step of performing an anodic phosphoric acid etch on said surfaces of the composite structure to be bonded together further includes a step of performing cathodic activation using sulfuric acid on said surfaces of the composite structure to be bonded together.

4. The process for bonding a composite structure for high temperature applications made of Ni based materials of claim 1 wherein the step of electrodepositing a layer of nickel on said surfaces of the composite structure to be bonded together further includes a step of plating nickel using a Ni-strike process that includes a solution of Ni-Chloride.

5. The process for bonding a composite structure for high temperature applications made of Ni based materials of claim 4 wherein the step of electrodepositing nickel using a Ni-strike process that includes a solution of Ni-Chloride further includes a step of electrodepositing using a Ni-plate process that includes a solution of Ni-sulfamate.

6. The process for bonding a composite structure for high temperature applications made of Ni based materials of claim 1 wherein the step of sealing exposed joints of the composite structure further includes the steps of:
    cleaning said surfaces of the composite structure to be bonded together; and
    welding said exposed joints of the composite structure.

7. The process for bonding a composite structure for high temperature applications made of Ni based materials of claim 1 wherein the step of applying hot isostatic processing to the composite structure further includes the steps of heating the composite structure within a temperature range of 1500 to 2225 degrees Fahrenheit.

8. The process for bonding a composite structure for high temperature applications made of Ni based materials of claim 1 wherein the step of applying hot isostatic processing to the composite structure further includes a step of forming diffusion bonds at an interface of said surfaces of the composite structure to be bonded together wherein said layer of nickel formed on said surfaces diffuses into the composite structure.

9. The process for bonding a composite structure for high temperature applications made of Ni based materials of claim 1, wherein applying the hot isostatic processing includes heating the composite structure at a temperature that is less than a melting temperature of the layer of nickel to maintain the layer of nickel in a solid state.

10. The process for bonding a composite structure for high temperature applications made of Ni based materials of claim 1, wherein each of the surfaces of the composite structure are non-planar.

11. A diffusion bonding process comprising:
    etching non-planar surfaces of a composite structure to be bonded together to remove oxide;
    depositing a layer of nickel on at least one of the etched non-planar surfaces to limit formation of an oxide layer;
    sealing a perimeter of an interface between the non-planar surfaces of the composite structure;
    applying isostatic pressure to the composite structure; and
    heating the composite structure in combination with applying the isostatic pressure at a temperature that is less than a melting temperature of the layer of nickel.

\* \* \* \* \*